United States Patent
Battles et al.

(10) Patent No.: US 7,116,364 B2
(45) Date of Patent: Oct. 3, 2006

(54) METHOD AND APPARATUS FOR MAINTAINING A CONSISTENT EFFECTIVE FOCAL LENGTH IN A DIGITAL CAMERA

(75) Inventors: Amy E. Battles, Windsor, CO (US); Jason E. Yost, Windsor, CO (US); Gregory V. Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 10/283,905

(22) Filed: Oct. 29, 2002

(65) Prior Publication Data

US 2004/0080660 A1    Apr. 29, 2004

(51) Int. Cl.
H04N 5/262    (2006.01)
G03B 13/00   (2006.01)

(52) U.S. Cl. .................................. 348/240.1; 348/347

(58) Field of Classification Search ........... 348/240.99, 348/240.1, 240.2, 240.3, 345
See application file for complete search history.

(56) References Cited

U.S. PATENT DOCUMENTS

| | | | |
|---|---|---|---|
| 5,684,532 A * | 11/1997 | Ely .......................... | 348/240.99 |
| 6,489,993 B1 * | 12/2002 | Sato et al. ................ | 348/240.3 |
| 6,757,013 B1 * | 6/2004 | Matsuzaka ................ | 348/240.1 |
| 2001/0003464 A1 * | 6/2001 | Niikawa ..................... | 348/341 |

* cited by examiner

Primary Examiner—Ngoc-Yen Vu
Assistant Examiner—Nicholas G. Giles

(57) ABSTRACT

A digital camera maintains a consistent effective focal length upon switching from a first focus mode to a second focus mode, the focus modes having different maximum focal lengths. Maintaining a consistent effective focal length across focus mode changes obviates the need for a user to reframe a scene upon changing focus modes.

22 Claims, 4 Drawing Sheets

METHOD AND APPARATUS FOR MAINTAINING A CONSISTENT EFFECTIVE FOCAL LENGTH IN A DIGITAL CAMERA

FIELD OF THE INVENTION

The present invention relates generally to digital cameras and more specifically to digital cameras with multiple focus modes having different focusing ranges.

BACKGROUND OF THE INVENTION

Some digital cameras, like their film counterparts, include a zoom lens with multiple focus modes, each focus mode having a different focusing range. For example, a zoom lens may have a macro focus mode and a normal focus mode. A macro focus mode allows the lens to focus on objects at a shorter minimum distance for a given focal length than the normal focus mode. This mode is convenient for taking extreme close ups.

Depending on the lens design, the range of available focal lengths in each focus mode may be different. In particular, the maximum focal length may be smaller in one focus mode than in the other. For example, a zoom lens may be designed to provide focal lengths of 35 mm to 105 mm in normal focus mode and 35 mm to 75 mm in macro focus mode. A user may zoom out to 105 mm while framing a subject in normal focus mode, only to decide that macro focus mode is the better choice. Upon switching to macro focus mode, however, the digital camera necessarily drops to a smaller focal length within the available range (e.g., 75 mm) for macro focus mode, forcing the user to reframe the picture.

It is thus apparent that there is a need in the art for an improved method and apparatus for maintaining a consistent effective focal length in a digital camera.

SUMMARY OF THE INVENTION

A method for maintaining a consistent effective focal length in a digital camera is provided. An apparatus for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1A:
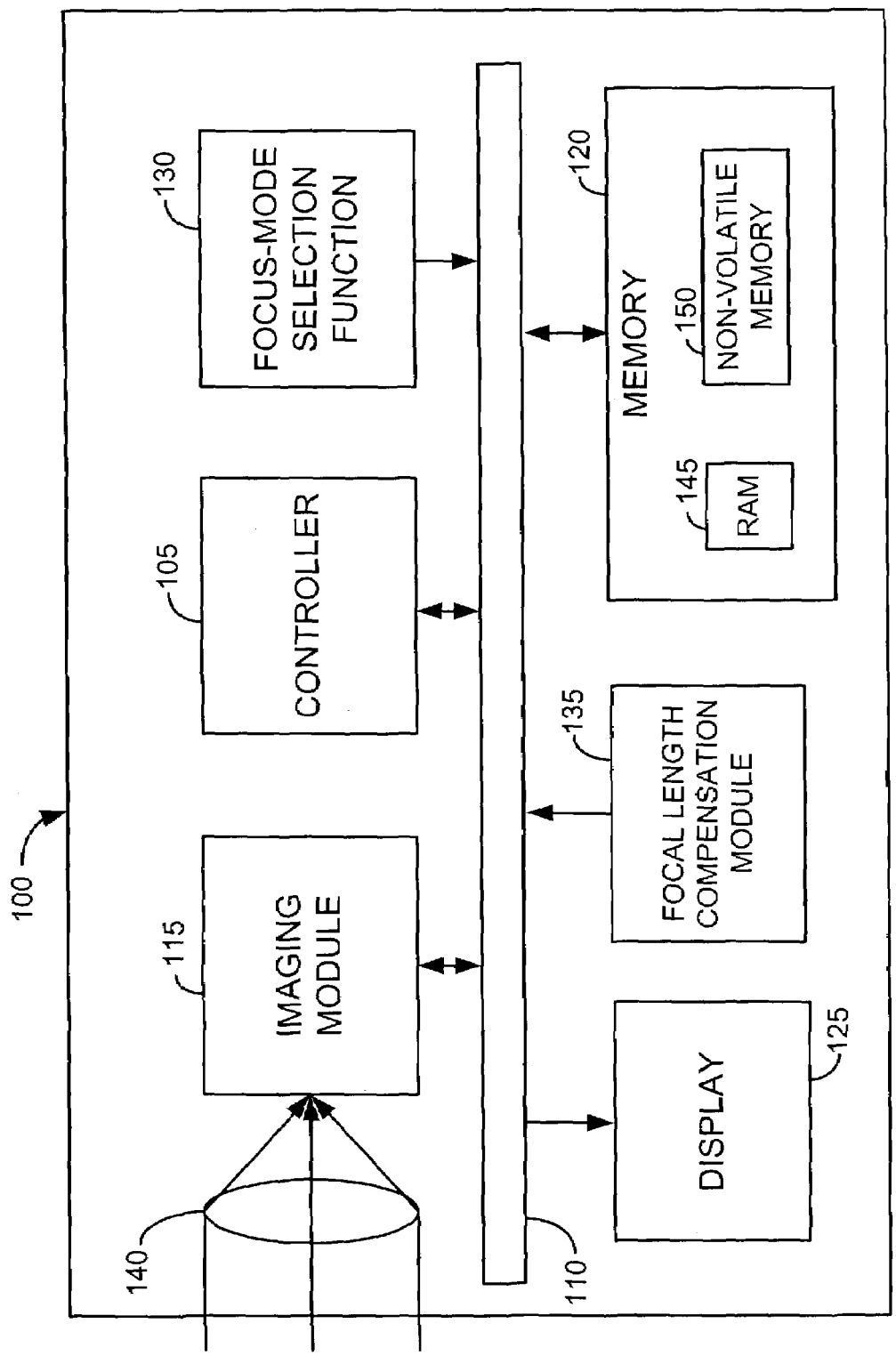
FIGS. 1A and 1B are functional block diagrams of a digital camera in accordance with an illustrative embodiment of the invention.

In a digital camera having multiple focus modes, each focus mode having a different maximum optical focal length, a consistent effective focal length may be maintained across focus-mode changes by combining optical and digital zoom. Digital zoom is typically accomplished by cropping a digital image and, optionally, applying pixel interpolation techniques well known in the image processing art to rescale the image to its original size. In some implementations, interpolation is applied to the previewed version of a digital image shown on the display of the digital camera but not on the final image that is captured. As those skilled in the art will recognize, digital zoom results in some loss of image quality. Therefore, maximum optical zoom may be employed, whenever possible, to achieve the highest possible image quality. Two introductory examples will serve to illustrate the principles of the invention. In both examples, the digital camera is assumed to have a normal focus mode with a focal length range of 35 mm to 105 mm and a macro focus mode with a focal length range of 35 mm to 75 mm. The macro focus mode may focus at distances ranging from, for example, 0.1 m to 0.7 m. The normal focus mode may focus at distances ranging from, for example, 0.5 m to infinity.

In the first example, a user attempts to frame a subject at an optical focal length of 105 mm in normal focus mode. The user then decides to switch to macro focus mode to focus at a shorter distance. Consequently, the zoom lens must drop to a maximum focal length of 75 mm. By applying digital zoom at 1.4×, however, the same effective focal length of 105 mm may be maintained. This allows the user to continue composing the shot without having to reframe the subject.

In the second example, a user attempts to frame a subject using a combination of digital zoom at 1.33× and optical zoom at 75 mm for an effective focal length of 100 mm while the digital camera is in macro focus mode. The user then decides to switch to normal focus mode. In this case, as much optical zoom as possible may be applied to maintain the same effective focal length of 100 mm. In fact, since 100 mm is less than the maximum focal length of 105 mm in normal focus mode, the effective focal length may be maintained entirely optically. Using as much optical zoom as possible in this situation maximizes the quality of the captured image.

Some digital cameras may have a zoom lens in which the normal focus mode has a smaller maximum focal length than the macro focus mode. The same techniques illustrated in the above examples still apply, however, depending on the effective focal length prior to a focus mode change and whether the focus mode change is to a focus mode having a smaller or larger maximum optical focal length.

An illustrative embodiment of the invention may be summarized in general terms as follows. A digital camera has at least a first focus mode and a second focus mode, each of which is designed to focus within a predetermined distance range. In some implementations, the digital camera may have more than two focus modes. For example, the first focus mode may be a normal focus mode, and the second focus mode may be a macro focus mode, or vice versa. The first focus mode has a first maximum focal length ("MAX. FL1"). The second focus mode has a second maximum focal length ("MAX. FL2") that is different from MAX. FL1. The "effective focal length" ("EFL") of the digital camera throughout this description is the overall magnification factor at which a digital image is captured, whether produced entirely by an optical zoom lens or by a combination of an optical zoom lens and digital zoom.

Table 1 summarizes the operation of this illustrative embodiment of the invention, in each of two situations, when the focus mode is switched from the first focus mode to the second focus mode.

TABLE 1

| EFL > MAX. FL2, MAX. FL1 > MAX. FL2 | EFL > MAX. FL1, MAX. FL1 < MAX. FL2 |
| --- | --- |
| Apply sufficient digital zoom to maintain effective focal length. | Apply as much optical zoom as possible to maintain effective focal length. |

As shown in Table 1, digital zoom may be applied to maintain the EFL in the second focus mode whenever the EFL in the first focus mode exceeds MAX. FL2 and MAX. FL1 is greater than MAX. FL2. Additionally, the maximum amount of available optical zoom may be applied to maintain the EFL in the second focus mode whenever the EFL in the first focus mode exceeds MAX. FL1 and MAX. FL1 is less than MAX. FL2.

Figure 1B:
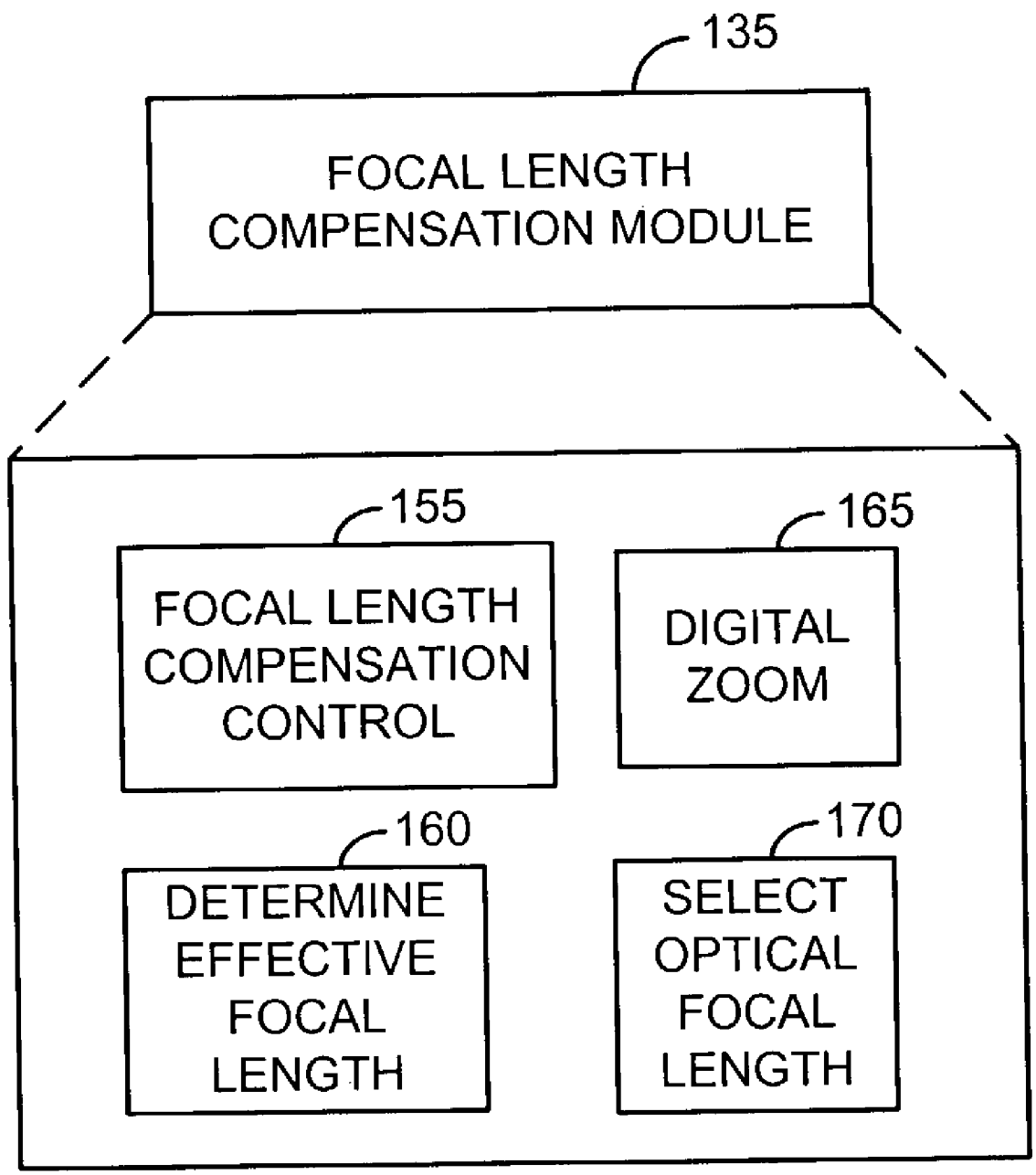

FIGS. 1A and 1B are functional block diagrams of a digital camera 100 in accordance with an illustrative embodiment of the invention. Digital camera 100 may be a digital still camera, a digital video camera, a combination digital still/video camera, or any other device capable of focusing and digitizing an optical image. In FIG. 1A, controller 105 communicates over data bus 110 with imaging module 115, memory 120, display 125, focus-mode selection function 130, and focal length compensation module 135. Lens system 140 produces optical images that are converted to digital images by imaging module 115. In a typical implementation, lens system 140 may comprise a zoom lens having multiple focus modes, each focus mode having a different focusing range (e.g., normal mode and macro mode). Focus-mode selection function 130 selects among the different focus modes. Focus-mode selection function 130 may be actuated by a user input device such as a button or menu option. Imaging module 115, in a typical implementation, may comprise an array of photosensors based on charge-coupled-device (CCD) or CMOS technology, an analog-to-digital converter (A/D), a gain control, and a digital signal processor (DSP) (not shown in FIG. 1A). Memory 120 further comprises random access memory (RAM) 145 and non-volatile memory 150.

Referring to FIG. 1B, Focal Length Compensation Module 135 may further comprise Modules Focal Length Compensation Control 155, Determine Effective Focal Length 160, Digital Zoom 165, and Select Optical Focal Length 170. These modules may, for example, be executed by controller 105. Module Focal Length Compensation Control 155 manages the process of maintaining a consistent effective focal length across focus mode changes by invoking the other modules as needed. Module Determine Effective Focal Length 160 retrieves, measures, or computes the effective focal length achieved by lens system 140 or by lens system 140 in combination with digital zoom. Since lens system 140 is typically controlled electromechanically with high precision, the optical focal length of lens system 140 may be set to a specific value by controller 105 (executing module Select Optical Focal Length 170) and tracked in, for example, a register or other memory location. Therefore, Module Determine Effective Focal Length 160 may determine the effective focal length by simply reading the current optical focal length of lens system 140 and, if applicable, multiplying the optical focal length by the digital zoom factor. Module Digital Zoom 165 crops digital images and optionally rescales them to their original size as explained earlier in this description. Module Select Optical Focal Length 170 sets lens system 140 to a particular optical focal length in accordance with the allowable focal length range of the applicable focus mode. The functional boundaries characterizing Modules Focal Length Compensation Control 155, Determine Effective Focal Length 160, Digital Zoom 165, and Select Optical Focal Length 170 are purely conceptual. For example, these functions may be implemented as four separate software or firmware modules, as fewer than four software or firmware modules, or in any other fashion that is advantageous, including custom hardware or a combination of hardware and software/firmware.

Figure 2A:
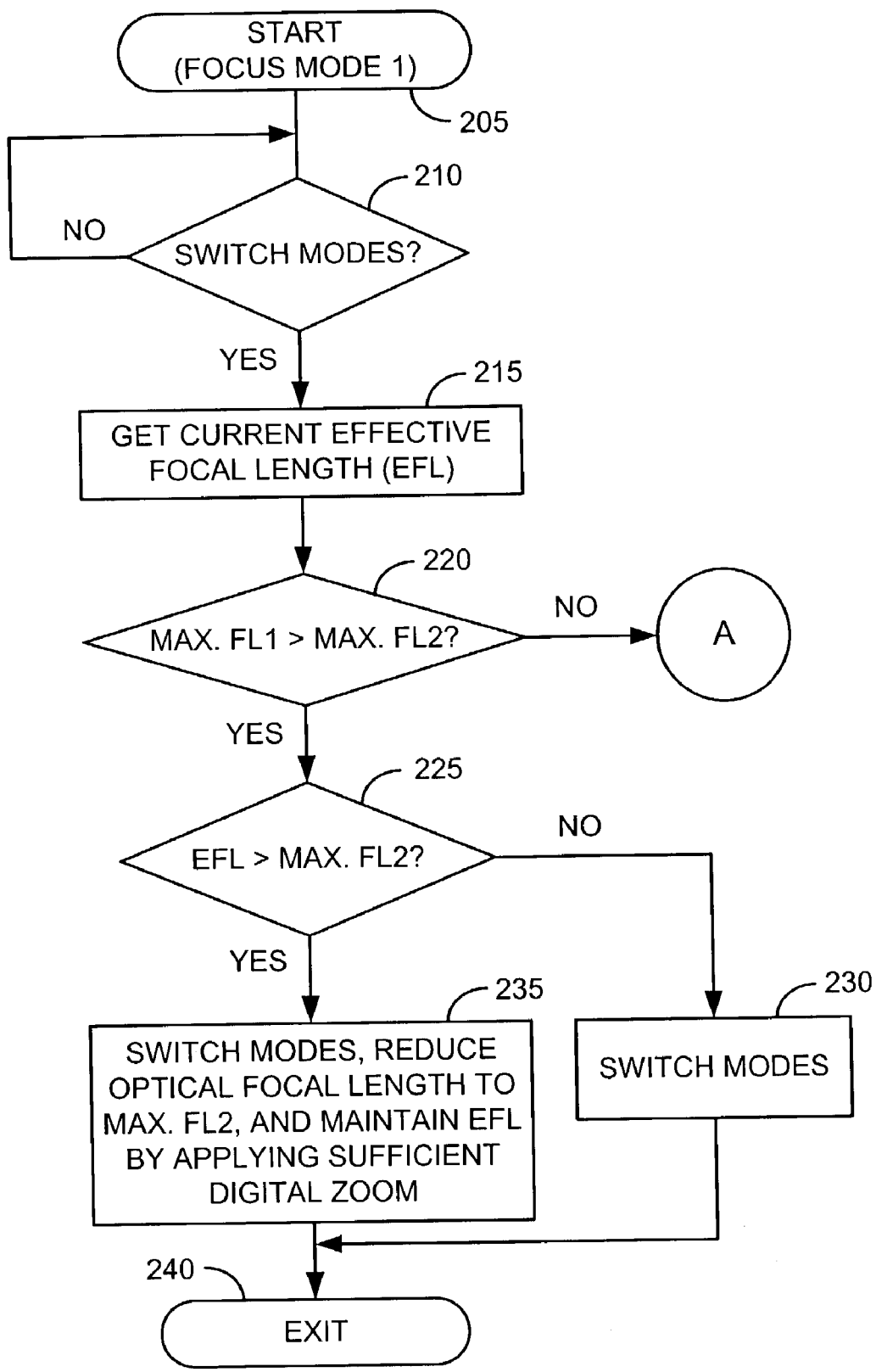
FIGS. 2A and 2B are a flowchart of the operation of the digital camera shown in FIGS. 1A and 1B in accordance with an illustrative embodiment of the invention.
Figure 2B:
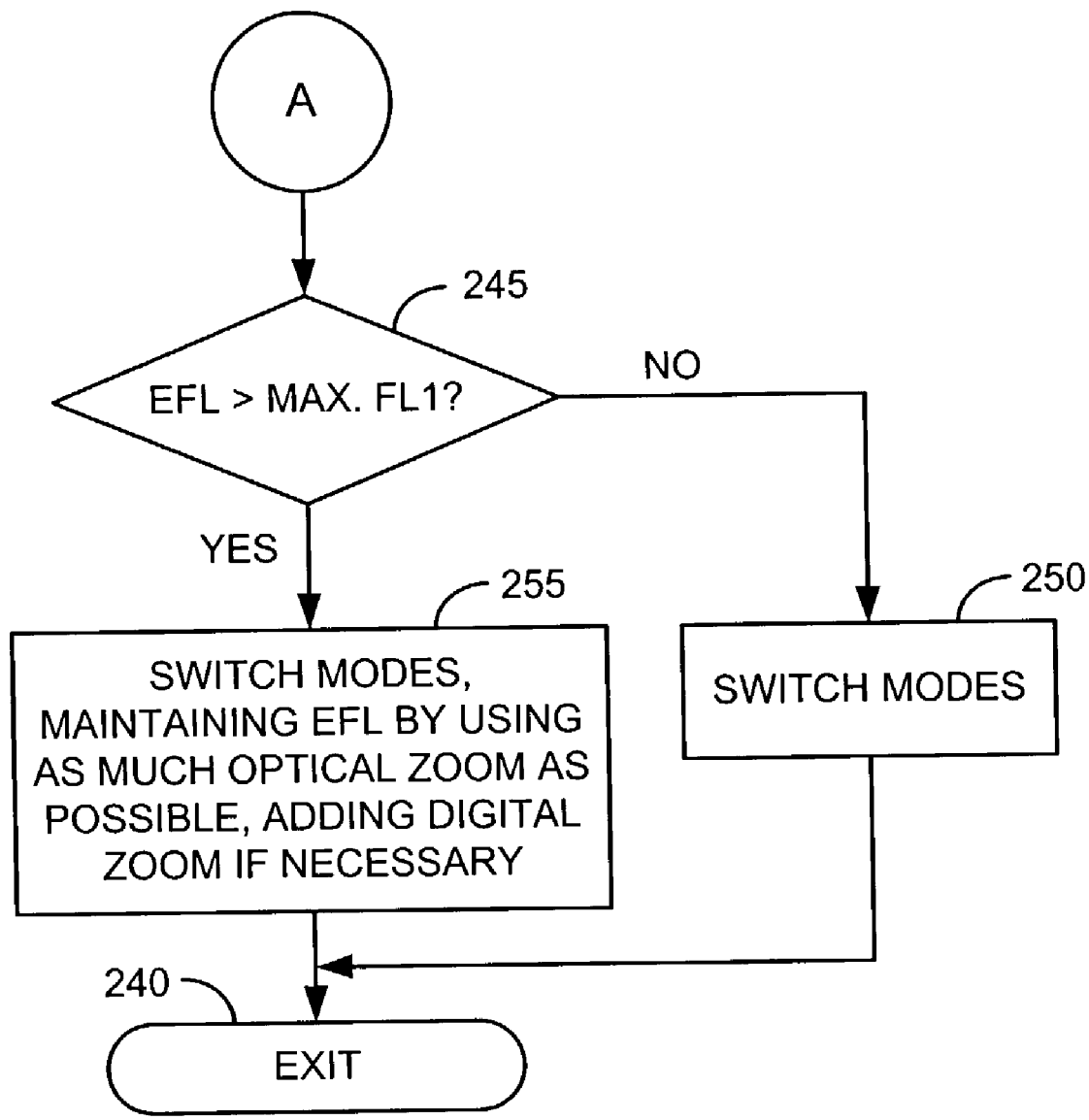

FIGS. 2A and 2B are a flowchart of the operation of digital camera 100 shown in FIGS. 1A and 1B in accordance with an illustrative embodiment of the invention. At 205 in FIG. 2A, lens system 140 of digital camera 100 is in the first focus mode. As explained above, whether the first focus mode is a macro focus mode or a normal focus mode is arbitrary. The same principles apply in either case. If a request to switch to the second focus mode is received from focus-mode selection function 130 at 210, Module Determine Effective Focal Length 160 acquires the current effective focal length (EFL) at 215. At 220, Module Focal Length Compensation Control 155 determines whether MAX. FL1 is greater than MAX. FL2. If so, control proceeds to 225. Otherwise, control proceeds to 245 in FIG. 2B. (Note that, since it is assumed that MAX. FL1 and MAX. FL2 are not equal, MAX. FL1 must be less than MAX. FL2 if the test at 220 is not true.) At 225, Module Focal Length Compensation Control 155 determines whether the EFL exceeds MAX. FL2. If not, lens system 140 is switched to the second focus mode at 230, and the process terminates at 240. Otherwise, control proceeds to 235, where Module Focal Length Compensation Control 155 determines what digital zoom factor is needed to maintain the EFL, Module Select Optical Focal Length 170 sets the focal length of lens system 140 to a focal length less than or equal to MAX. FL2, Module Digital Zoom 165 applies sufficient digital zoom to maintain the EFL, and the lens system 140 is switched to the second focus mode.

If control proceeds to 245 in FIG. 2B after the test at 220, Module Focal Length Compensation Control 155 determines whether the EFL exceeds MAX. FL1. If not, control proceeds to 250, where lens system 140 is switched to the second focus mode, and the process terminates at 240. Otherwise, control proceeds to 255, where Module Focal Length Compensation Control 155 determines whether the EFL exceeds MAX. FL2. If not, the focal length of lens system 140 may be set to the EFL to maximize image quality. If the EFL exceeds MAX. FL2, the EFL may be maintained by setting the focal length of lens system 140 to MAX. FL2 using Module Select Optical Focal Length 170 and adding digital zoom using Module Digital Zoom 165.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining a consistent effective focal length in a digital camera, the digital camera having a lens system, the lens system having a first focus mode and a second focus mode, the first focus mode having a first maximum focal length, the second focus mode having a second maximum focal length, the method comprising:
- determining an effective focal length of the digital camera while the lens system is in the first focus mode; and
- applying sufficient digital zoom to maintain the effective focal length, when the effective focal length exceeds the second maximum focal length, the second maximum focal length is smaller than the first maximum focal length, and the lens system is switched from the first focus mode to the second focus mode.

2. The method of claim 1, wherein, while the lens system is in the first focus mode, the effective focal length is achieved by a combination of optical zoom and digital zoom.

3. The method of claim 1, wherein the effective focal length is maintained by a combination of optical zoom and digital zoom.

4. The method of claim 1, wherein the first focus mode is a macro focus mode and the second focus mode is a normal focus mode.

5. The method of claim 1, wherein the first focus mode is a normal focus mode and the second focus mode is a macro focus mode.

6. A method for maintaining a consistent effective focal length in a digital camera, the digital camera having a lens system, the lens system having a first focus mode and a second focus mode, the first focus mode having a first maximum focal length, the second focus mode having a second maximum focal length, the method comprising:
- determining an effective focal length of the digital camera while the lens system is in the first focus mode; and
- applying as much optical zoom as possible to maintain the effective focal length, when the effective focal length exceeds the first maximum focal length, the first maximum focal length is smaller than the second maximum focal length, and the lens system is switched from the first focus mode to the second focus mode.

7. The method of claim 6, wherein, while the lens system is in the first focus mode, the effective focal length is achieved by a combination of optical zoom and digital zoom.

8. The method of claim 6, wherein the effective focal length is maintained by a combination of optical zoom and digital zoom.

9. The method of claim 6, wherein the first focus mode is a macro focus mode and the second focus mode is a normal focus mode.

10. The method of claim 6, wherein the first focus mode is a normal focus mode and the second focus mode is a macro focus mode.

11. A digital camera, comprising:
- a lens system to produce an optical image, the lens system having a first focus mode and a second focus mode, the first focus mode having a first maximum focal length, the second focus mode having a second maximum focal length;
- a function to select between the first and second focus modes;
- an imaging module to convert the optical image to a digital image; and
- a focal length compensation module configured to apply sufficient digital zoom to the digital image to maintain an effective focal length of the digital camera, when the effective focal length exceeds the second maximum focal length, the second maximum focal length is smaller than the first maximum focal length, and the lens system is switched from the first focus mode to the second focus mode.

12. The digital camera of claim 11, wherein, while the lens system is in the first focus mode, the digital camera is configured to achieve the effective focal length by a combination of optical zoom and digital zoom.

13. The digital camera of claim 11, wherein the focal length compensation module is configured to maintain the effective focal length by a combination of optical zoom and digital zoom.

14. The digital camera of claim 11, wherein the first focus mode is a macro focus mode and the second focus mode is a normal focus mode.

15. The digital camera of claim 11, wherein the first focus mode is a normal focus mode and the second focus mode is a macro focus mode.

16. A digital camera, comprising:
- a lens system to produce an optical image, the lens system having a first focus mode and a second focus mode, the first focus mode having a first maximum focal length, the second focus mode having a second maximum focal length;
- a function to select between the first and second focus modes;
- an imaging module to convert the optical image to a digital image; and
- a focal length compensation module configured to apply as much optical zoom as possible to the optical image to maintain an effective focal length of the digital camera, when the effective focal length exceeds the first maximum focal length, the first maximum focal length is smaller than the second maximum focal length, and the lens system is switched from the first focus mode to the second focus mode.

17. The digital camera of claim 16, wherein, while the lens system is in the first focus mode, the digital camera is configured to achieve the effective focal length by a combination of optical zoom and digital zoom.

18. The digital camera of claim 16, wherein the focal length compensation module is configured to maintain the effective focal length by a combination of optical zoom and digital zoom.

19. The digital camera of claim 16, wherein the first focus mode is a macro focus mode and the second focus mode is a normal focus mode.

20. The digital camera of claim 16, wherein the first focus mode is a normal focus mode and the second focus mode is a macro focus mode.

21. A digital camera, comprising:
- optical means for producing an optical image, the optical means having a first focus mode and a second focus mode, the first focus mode having a first maximum focal length, the second focus mode having a second maximum focal length;
- means for selecting between the first and second focus modes;
- means for converting the optical image to a digital image; and
- focal length compensation means for applying sufficient digital zoom to the digital image to maintain an effective focal length of the digital camera, when the effective focal length exceeds the second maximum focal length, the second maximum focal length is smaller than the first maximum focal length, and the optical means is switched from the first focus mode to the second focus mode.

22. A digital camera, comprising:
optical means for producing an optical image, the optical means having a first focus mode and a second focus mode, the first focus mode having a first maximum focal length, the second focus mode having a second maximum focal length;
means for selecting between the first and second focus modes;
means for converting the optical image to a digital image; and
focal length compensation means for applying as much optical zoom as possible to the optical image to maintain an effective focal length of the digital camera, when the effective focal length exceeds the first maximum focal length, the first maximum focal length is smaller than the second maximum focal length, and the optical means is switched from the first focus mode to the second focus mode.

* * * * *